United States Patent [19]

Kachi et al.

[11] Patent Number: 4,658,125

[45] Date of Patent: Apr. 14, 1987

[54] GIFT COUPON DETECTABLE BY BILL SORTER

[75] Inventors: Kenjiro Kachi, Komaki; Hideaki Onda, Ageo; Yukichi Hayashi, Sakado; Kenzo Yoshihara, Konosu; Masayuki Watanabe, Wako; Masaki Akagawa, Sakado; Yoshikazu Mori, Iruma, all of Japan

[73] Assignee: Nipponcoinco Co., Ltd., Tokyo, Japan

[21] Appl. No.: 711,612

[22] Filed: Mar. 14, 1985

[30] Foreign Application Priority Data

Mar. 19, 1984 [JP] Japan .................. 59-51153

[51] Int. Cl.$^4$ .............................................. G06K 7/08
[52] U.S. Cl. .................. 235/449; 235/487; 235/493
[58] Field of Search ................ 235/449, 487, 493

[56] References Cited

U.S. PATENT DOCUMENTS 3,108,824 10/1963 Fischer ..................... 235/493

Primary Examiner—Harold I. Pitts
Attorney, Agent, or Firm—Koda and Androlia

[57] ABSTRACT

A gift coupon detectable by a bill sorter, comprising a rectangular paper having a width capable of being inserted into a travelling path of the bill sorter and also having predetermined characters and design, the gift coupon further having: a first data train comprising data units formed by a magnetic ink and arranged in a row at predetermined intervals, and a second data train comprising data units corresponding respectively to the data units of the first data train, formed by a magnetic ink and arranged in a row, data units in predetermined positions of the second data train being cut off to provide blank units to record data required for the gift coupon such as the significance of an amount of money, the name of commodity to be exchanged, etc. according to the arrangement of the blank units, the first and second data trains being disposed in positions capable of being detected by two magnetic detection heads for bill sorting provided in the bill sorter during travel of the gift coupon along the travelling path.

10 Claims, 10 Drawing Figures

GIFT COUPON DETECTABLE BY BILL SORTER

BACKGROUND OF THE INVENTION

1. Field of the Invention

The present invention relates to a gift coupon to exchange for commodities such as beer directly in a store, and particularly to a gift coupon capable of being exchanged for commodities by utilization of a vending machine having a bill (paper money) sorter.

2. Description of the Prior Art

In general, gift coupons for commodities such as beer are issued so that the person who carries a gift coupon with him can exchange it for the commodity indicated thereon. On each gift coupon are described the significance of an amount of money, the name of commodity, the number of exchangeable articles and the issuer.

Nowadays, vending machines are in wide use in various places, and so if there is a gift coupon which is employable in vending machines having a bill sorter, it will not only be very convenient to the users and handling stores but also greatly improve the usefulness and utility of gift coupon.

SUMMARY OF THE INVENTION

The present invention has been accomplished in view of the foregoing, and it is an object thereof to provide a gift coupon capable of being used also in vending machines having a bill sorter.

It is another object of the present invention to provide a gift coupon capable of being correctly distinguished from paper money, avoiding the likelihood of dishonest use and recording a lot of data, including the significance of an amount of money, the name of commodity and the number of articles, to improve the reliability of sorting function.

BRIEF DESCRIPTION OF THE DRAWINGS

The accompanying drawings illustrate embodiments of the present invention, in which.

DESCRIPTION OF PREFERRED EMBODIMENTS

Embodiments of the present invention will be described in detail hereinunder with reference to the drawings.

Figure 1:
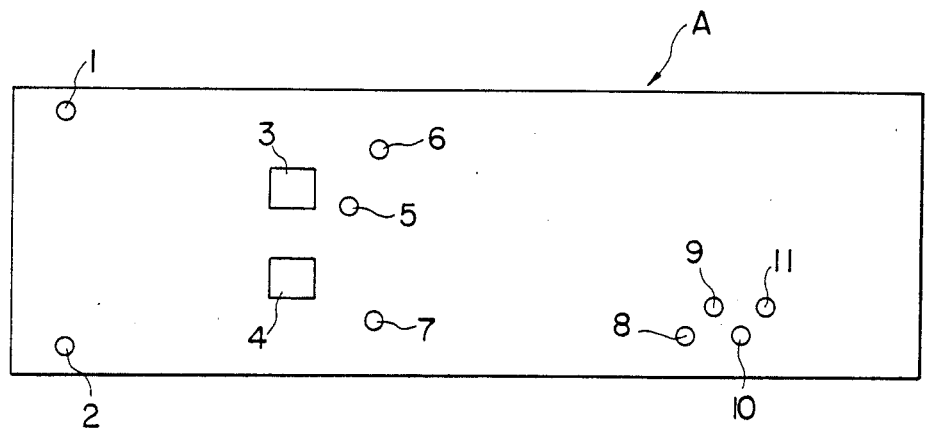
FIG. 1 illustrates a layout of detection points relative to a bill travelling path.

Referring first to FIG. 1, there is illustrated a layout of detection points of a bill sorter, in which a pair of photo sensors 1 and 2 for detecting a short side width of a bill (paper money) and also detecting "Incoming" of the bill, a pair of magnetic detection heads 3 and 4 for detecting information date such as whether the bill is regular or false, the kind of money and the bill travelling direction which are written on the bill in magnetic ink, photo sensors 5, 6 and 7 for detecting a paper thickness, and photo sensors 8 and 11 which detect a paper length on the basis of a distance from the photo sensors 1 and 2, are disposed in a bill travelling path A. These detecting functions permit descrimination as to whether the travelling bill is regular or false, of what kind it is and whether it is in an overlapped condition. Upon confirmation of a regular bill, a required commodity and the change if necessary are delivered. This is a well-known mechanism.

Figure 2:
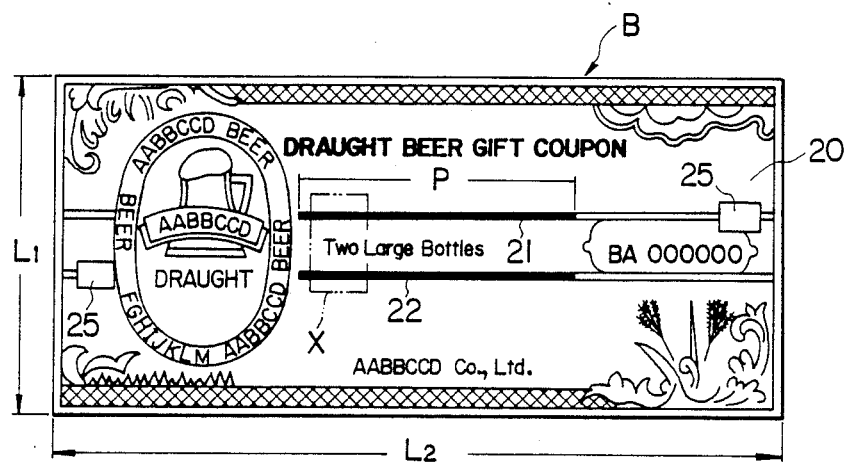
FIG. 2 is a plan view of a gift coupon.

Referring now to FIG. 2, there is illustrated a gift coupon according to an embodiment of the present invention, in which visually confirmable data such as the name of commodity, the name of issuer, reference number and pattern are described in a designed form on the gift coupon, like conventional gift coupons. This gift coupon, designated B, comprises a sheet of paper 20 having a short side $L_1$ which is equal to the width of bill (76 mm) and a long side $L_2$ (e.g. 165 mm) which is different from the long side of any bill.

Figure 3:
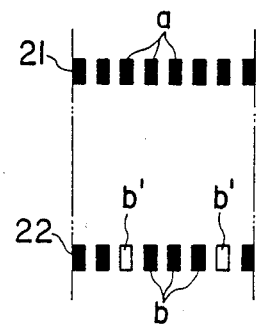
FIG. 3 is an enlarged view of X portion in FIG. 2.

The gift coupon B has a first data train 21 to be detected by one magnetic detection head 3 disposed in the bill travelling path A, and a second data train 22 to be detected by the other magnetic detection head 4, the first and second data trains 21 and 22 being disposed up and own in parallel in the range of P and nearly centrally of the paper 20. As shown on a larger scale in FIG. 3, the first data train 21 comprises rectangular data units, a, arranged regularly at predetermined intervals of 1.05 mm, the rectangular data units being each 1 mm long and 1.05 mm wide and formed of a magnetic ink. On the other hand, as shown in the same figure, the second data train 22 comprises rectangular data units b having the same size and arranged in the same fashion as the data units a but is different from the first data train 21 in that data units b in certain positions are removed and made blank units b'. According to the layout of the blank units b', various data required for gift coupon such as the direction of insertion of the gift coupon B relative to the travelling path A, the significance of an amount of money, the number of articles and indications of the gift coupon, are recorded to the second information train 22.

Though not shown, the data units a and b are each constituted by four fine lines each 0.15 mm arranged in parallel at intervals of 0.15 mm.

When the gift coupon B having the above construction is inserted into the bill travelling path A, its short side on its insertion side as well as its "Incoming" are detected by the paired photo sensors 1 and 2, then the magnetic detection heads 3 and 4 read the data units a and b of the first and second data trains 21 and 22, respectively, and discriminate various data recorded in the second data train 22 in relation to the first data train 21.

With this arrangement, therefore, irregular signals obtained from the second data train 22 are compared with a certain reference signal obtained from the first data train 21, so in comparison with the absence of the first data train 21, not only it becomes easier to read the data of the second data train 22 but also, for example, even in the event of occurrence of a change in feed rate of the gift coupon B, the time required for a blank unit b' in the second data train 22 to pass the magnetic detection head 4 and the time required for the corresponding data unit a in the first data train 21 to pass the magnetic head 3 are maintained equal, and therefore the data reading can be done highly accurately. Besides, a lot of data, including those for distinction from paper money, can be recorded in the second data train 22.

Figure 4:
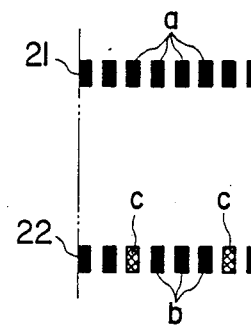
FIGS. 4 and 5A and 5B illustrate other embodiments corresponding to FIG. 3.

With the above construction, however, the second data train 22 is composed of data units b and blank units b', so if one looks at the gift coupon B carefully, he will become aware that some data is contained in the second data train 22. For this reason, there is fear that one who has noted it would forge a gift coupon by imitating the layout of the data units b in the second data train 22 and make a dishonest use. In the present invention, in order to eliminate this fear, pseudo-data units c are formed with a non-magnetic ink in the positions of the blank units b' in the second data train 22 to camouflage the data contained in the second data train, as shown in FIG. 4.

Figure 5A:
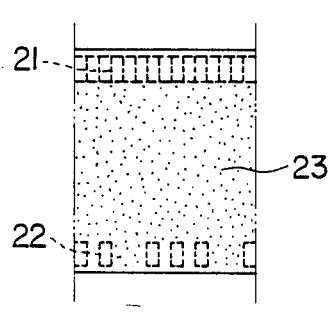
Figure 5B:
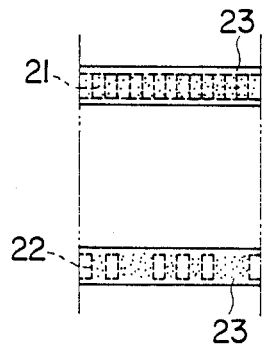

In this case, since each data unit comprises extremely fine lines, the work for printing the pseudo-data c with a non-magnetic ink in only the positions of the blank units b' in the second data train 22 is very difficult and causes an increase of cost; besides, slight dislocations during printing of the pseudo-data units c would show that they are pseudo-data units, and consequently the formation of the pseudo-data units c becomes meaningless. This inconvenience can be avoided by such modes as shown in FIGS. 5A and B, in which the first and second data trains 21 and 22 are coated as indicated at 23 in common or separately with, for example, a non-magnetic silver ink to camouflage as if it were a designed pattern.

Figure 6:
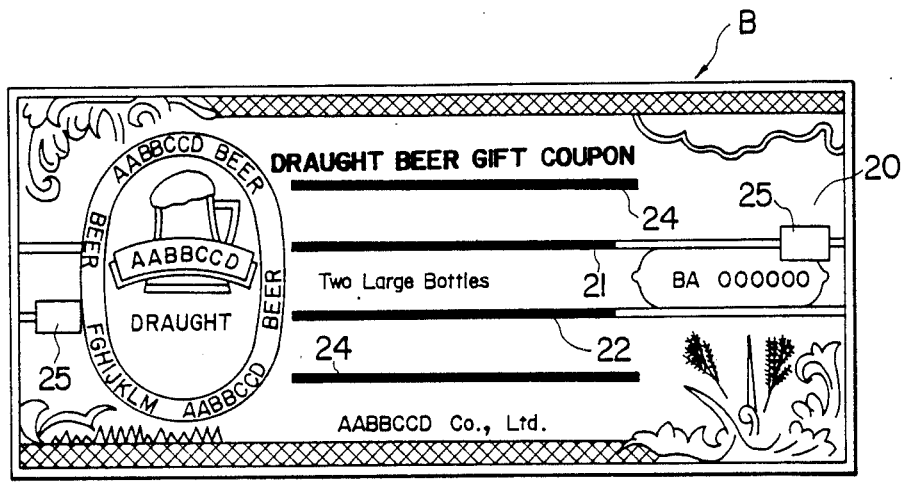
FIGS. 6, 7 and 8 illustrate further embodiments corresponding to FIG. 2.

Referring now to FIG. 6, there is illustrated another embodiment, in which pseudo-data trains 24 are formed in positions other than the positions of the first and second data trains, using a magnetic or non-magnetic ink same as or similar to the first and second data trains 21 and 22, to confuse perception of the true data trains.

Figure 7:

FIG. 7 shows an arrangement which permits a correct detection of the first and second data trains 21 and 22 even when the travelling direction of the gift coupon B relative to the travelling path A is opposite to that shown in FIG. 2. More specifically, a second data train 22' and a first data train 21' are disposed closely in parallel with the first and second data trains 21 and 22, respectively, and thus two upper trains and two lower trains are formed. In this arrangement, the data recording direction of the upper second data train 22' and that of the lower second data train 22 are opposite to each other, thereby permitting a double check on the data contained in the second data train.

Figure 8:
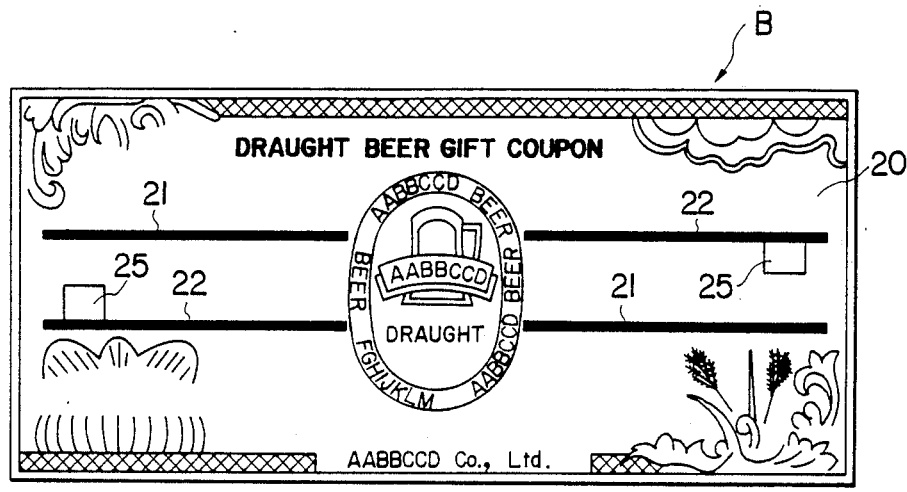

Further, FIG. 8 illustrates an embodiment in which first and second data trains 21 and 22 are each disposed in right and left positions. Also in this arrangement, the data included in the second data train can be detected without any trouble irrespective of the difference of the travelling direction of gift coupon relative to the travelling path A.

Thus, dishonest use preventing modes have been described mainly with respect to gift coupons per se in FIGS. 1 to 8. The reference numeral 25 in FIGS. 2 and 6 to 8 denotes an easily light transmitting portion provided in a position corresponding to a part of gift coupon B, or a part of paper money which is sure to be printed, and also corresponding to a predetermined photo sensor in the travelling path A, so that paper money and gift coupon can be distinguished from each other not only by the length of each long side but also but the photo sensor in the travelling path A. As the gift coupon B passes the easily light transmitting portion 25, the data are detected by the photo sensor whereby an electric distinction is made between gift coupon B and paper money.

Figure 9:
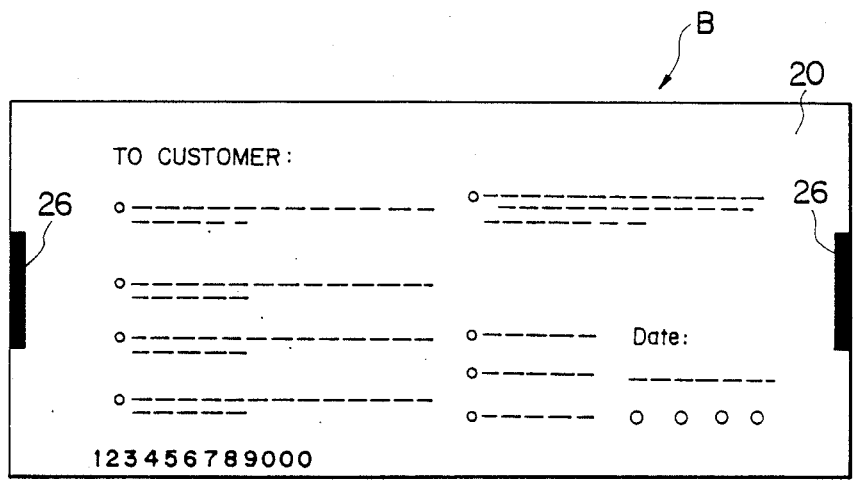
FIG. 9 is a rear side view of the gift coupon.

In FIG. 9, a strip-like non-light transmitting portion, e.g. black portion, 26 is provided on each short side, preferably centrally on the back thereof, of the gift coupon B. With this construction, since paper money is not provided with the black portion 26, distinction between gift coupon and paper money can be made by the photo sensor disposed in the corresponding position. Besides, the said distinction is made immediately after the gift coupon B is conducted into the travelling path A, so the circuit operations of various functions required for paper money detection are stopped in accordance with the discrimination signal, while only the circuit operations of various functions required for gift coupon detection are allowed to perform, whereby unnecessary circuit operations can be avoided.

According to the present invention, as set forth hereinabove, there can be provided a gift coupon which is applicable to vending machines having a bill sorter. Such a gift coupon is not only very convenient to its users and commodity handling stores but also can improve its usefulness and utility to a remarkable extent. And various other advantages can be attained; for example, a lot of data can be recorded correctly, an exact distinction between paper money and gift coupon can be made, and a dishonest use of gift coupon itself is made difficult.

What is claimed is:

1. A gift coupon detectable by a bill sorter, comprising a rectangular paper having a width capable of being inserted into a travelling path of the bill sorter and also having predetermined characters and design, said gift coupon further having:

a first data train comprising data units formed by a magnetic ink and arranged in a row at predetermined intervals; and a second data train comprising data units corresponding respectively to the data units of the first data train, formed by a magnetic ink and arranged in a row, data units in predetermined positions of the second data train being cut off to provide blank units to record data required for the gift coupon such as the significance of an amount of money, the name of commodity to be exchanged, etc. according to the arrangement of the blank units, said first and second data trains being disposed in positions capable of being detecting by two magnetic detection heads for bill sorting provided in the bill sorter during travel of the gift coupon along said travelling path.

2. A gift coupon detectable by a bill sorter, comprising a rectangular paper having a width capable of being inserted into a travelling path of the bill sorter and also having predetermined characters and design, said gift coupon further having:

a first data train comprising data units formed by a magnetic ink and arranged in a row at predetermined intervals; and a second data train comprising data units corresponding respectively to the data units of the first data train, formed by a magnetic ink and arranged in a row, data units in predetermined positions of the second data train being cut off to provide blank units to record data required for the gift coupon such as the significance of an amount of money, the name of commodity to be exchanged, etc. according to the arrangement of the blank units, and pseudo-data units formed by a non-magnetic ink and having a form equal to the data units being formed in the positions of the blank units, said first and second data trains being disposed in positions capable of being detected by two magnetic detection heads for bill sorting provided in the bill sorter during travel of the gift coupon along said travelling path.

3. A gift coupon detectable by a bill sorter, comprising a rectangular paper having a width capable of being inserted into a travelling path of the bill sorter and also having predetermined characters and design, said gift coupon further having:
- a first data train comprising data units formed by a magnetic ink and arranged in a row at predetermined intervals; and
- a second data train comprising data units corresponding respectively to the data units of the first data train, formed by a magnetic ink and arranged in a row, data units in predetermined positions of the second data train being cut off to provide blank units to record data required for the gift coupon such as the significance of an amount of money, the name of commodity to be exchanged, etc. according to the arrangement of the blank units,
- said first and second data trains being disposed in positions capable of being detected by two magnetic detection heads for bill sorting provided in the bill sorter during travel of the gift coupon along said travelling path, and said first and second data trains being coated with a non-magnetic ink.

4. A gift coupon detectable by a bill sorter, comprising a rectangular paper having a width capable of being inserted into a travelling path of the bill sorter and having predetermined characters and design, said gift coupon further having:
- a first data train comprising data units formed by a magnetic ink and arranged in a row at predetermined intervals;
- a second data train comprising data units corresponding respectively to the data units of the first data train, formed by a magnetic ink and arranged in a row, data units in predetermined positions of the second data train being cut off to provide blank units to record data required for the gift coupon such as the significance of an amount of money, the name of commodity to be exchanged, etc. according to the arrangement of the blank units,
- another first data train disposed closely in parallel with said second data train; and
- another second data train disposed closely in parallel with said first data train,
- said first and second data trains and said another first and second data trains being disposed in positions capable of being detected by two magnetic detection heads for bill sorting provided in the bill sorter during travell of the gift coupon along said travelling path, the data recording direction of said second data train and that of said another second data train being different from each other.

5. A gift coupon detectable by a bill sorter, comprising a rectangular paper having a width capable of being inserted into a travelling path of the bill sorter and also having predetermined characters and design, said gift coupon further having:
- a first data train comprising data units formed by a magnetic ink and arranged in a row at predetermined intervals;
- a second data train comprising data units corresponding respectively to the data units of the first data train, formed by a magnetic ink and arranged in a row, data units in predetermined positions of the second data train being cut off to provide blank units to record data required for the gift coupon such as the significance of an amount of money, the name of commodity to be exchanged, etc. according to the arrangement of the blank units,
- another first data train disposed on an extension of said second data train; and
- another second data train disposed on an extension of said first data train,
- said first and second data trains and said another first and second data trains being disposed in positions capable of being detected by two magnetic detection heads for bill sorting provided in the bill sorter during travel of the gift coupon along said travelling path, the data recording direction of said second data train and that of said another second data train being different from each other.

6. A gift coupon detectable by a bill sorter, comprising a rectangular paper having a width capable of being inserted into a travelling path of the bill sorter and also having predetermined characters and design, said gift coupon further having:
- a first data train comprising data units formed by a magnetic ink and arranged in a row at predetermined intervals;
- a second data train comprising data units corresponding respectively to the data units of the first data train, formed by a magnetic ink and arranged in a row, data units in predetermined positions of the second data train being cut off to provide blank units to record data required for the gift coupon such as the significance of an amount of money, the name of commodity to be exchanged, etc. according to the arrangement of the blank unit, said first and second data trains being disposed in positions capable of being detected by two magnetic detection heads for bill sorting provided in the bill sorter during travel of the gift coupon along said travelling path; and
- pseudo-data trains disposed in parallel with and in positions different from said first and second data trains.

7. A gift coupon detectable by a bill sorter as set forth in claim 6, wherein said pseudo-data trains comprises pseudo-data units formed by a non-magnetic ink and arranged in a row.

8. A gift coupon detectable by a bill sorter, comprising a rectangular paper having a width capable of being inserted into a travelling path of the bill sorter and also having predetermined characters and design, said gift coupon further having:
- a first data train comprising data units formed by a magnetic ink and arranged in a row at predetermined intervals;
- a second data train comprising data units corresponding respectively to the data units of the first data train, formed by a magnetic ink and arranged in a row, data units in predetermined positions of the second data train being cut off to provide blank units to record data required for the gift coupon such as the significance of an amount of money, the name of commodity to be exchanged, etc. according to the arrangement of the blank units, said first and second data trains being disposed in positions capable of being detected by two magnetic detection heads for bill sorting provided in the bill sorter during travel of the gift coupon along said travelling path; and an easily light transmitting portion capable of being detected by a photo sensor provided in said travelling path, said easily light transmitting portion being provided in a position corresponding to a patterned portion of paper money.

9. A gift coupon detectable by a bill sorter, comprising a rectangular paper having a width capable of being inserted into a travelling path of the bill sorter and also having predetermined characters and design, said gift coupon further having:
- a first data train comprising units formed by a magnetic ink and arranged in a row at predetermined intervals;
- a second data train comprising data units corresponding respectively to the data units of the first data train, formed by a magnetic ink and arranged in a row, data units in predetermined positions of the second data train being cut off to provide blank units to record data required for the gift coupon such as the significance of an amount of money, the name of commodity to be exchanged, etc. according to the arrangement of the blank unit, said first and second data trains being disposed in positions capable of being detected by two magnetic detection heads for bill sorting provided in the bill sorter during travel of the gift coupon along said travelling path; and
- a non-light transmitting portion capable of being detected by a photo sensor provided in said travelling path, said non-light transmitting portion being disposed at a short side portion of the rectangular paper.

10. A gift coupon detectable by a bill sorter as set forth in claim 9, wherein said non-light transmitting portion is black-colored and provided centrally of said short side portion of the rectangular paper.

* * * * *

UNITED STATES PATENT AND TRADEMARK OFFICE
CERTIFICATE OF CORRECTION

PATENT NO. : 4,658,125
DATED : April 14, 1987
INVENTOR(S) : Kenjiro Kachi, et al It is certified that error appears in the above—identified patent and that said Letters Patent is hereby corrected as shown below:

On the Title Page:
At [75] Inventors: change "Watanabe" to --Watabe--.

Signed and Sealed this

Eleventh Day of August, 1987

*Attest:*

DONALD J. QUIGG

*Attesting Officer*   *Commissioner of Patents and Trademarks*